United States Patent [19]

Littlefield

[11] 4,072,650

[45] Feb. 7, 1978

[54] FRICTION MATERIALS

[76] Inventor: John B. Littlefield, P.O. Box 243, Belle Haven, Va. 23306

[21] Appl. No.: 594,953

[22] Filed: July 11, 1975

[51] Int. Cl.$^2$ ............................ C08K 3/10; C08K 5/01
[52] U.S. Cl. .................................... 260/42.22; 106/36; 260/42.25; 260/42.32; 260/42.37; 260/42.54; 260/887; 260/998.13; 260/DIG. 39
[58] Field of Search .................. 260/998.13, DIG. 39, 260/42.32, 887, 42.22, 42.37, 42.54; 106/36

[56] References Cited

U.S. PATENT DOCUMENTS

| | | | |
|---|---|---|---|
| 2,901,456 | 8/1959 | Spokes | 260/998.13 |
| 3,227,249 | 1/1966 | Kuzmick et al. | 260/DIG. 39 |

Primary Examiner—James H. Derrington
Attorney, Agent, or Firm—J. Gibson Semmes

[57] ABSTRACT

A friction material composition comprising asbestos fibers, mineral fillers which are heat stable, friction modifiers such as metal particles, abrasives, elastomer and ground polymerized and cured cashew nut shell oil wherein compositions are added which will favor the deposition of carbon at elevated temperatures and reduce the amount of intermediate decomposition products such as may cause fade. The invention is such as to permit the use of higher bond ratios and consequently produce better wearing, quieter friction materials which are more constant in action and kinder to the drum or disc against which they operate, maintaining a desirable high static friction when cold without an attendant fade condition when used under high energy conditions. Specifically, dehydrogenation catalysts of an organic metallic base are added at least to the binder and in certain instances to the organic fillers to promote carbonization or coking at the working surface, without formation of intermediate molecular size compounds which contribute to fade conditions. The most satisfactory catalyst has been found to be ferrocene, otherwise known as dicyclopentadienyliron.

8 Claims, No Drawings

FRICTION MATERIALS

BACKGROUND OF THE INVENTION

Friction materials are widely used in brakes to slow or arrest motion of vehicles or moving machinery, and in clutches to impart motion to vehicles or mechanical parts. In every application, other than as a parking brake, the friction material working against a drum, disc, or wheel, usually of cast iron or steel, transfers the energy of motion into heat, resulting in an increase in the temperature of the friction element and of the opposing surface. A most essential and desirable characteristic of any brake or clutch is uniformity of friction over a wide range of conditions, particularly temperature, throughout the life of the material. The next in importance is durability — long life.

Most friction materials consist of asbestos fibers, mineral fillers, both of which are eminently heat stable. Friction modifiers such as metal particles, abrasives, ground rubber, and ground polymerized and cured cashew nut shell oil, otherwise known as cardolite dust. All of these components are bound together by a resinous or elastomeric binder; it may be a phenol-formaldehyde resin alone or one modified or blended with cross linkable oils such as drying oils, rubber, natural or synthetic, or may be entirely an elastomer of which there is an endless variety. A degree of softness may be imparted to the phenolic resin by substituting meta para cresols or other modified phenols for part of the phenol.

One of the reasons for thus softening the binder is to impart a degree of flexibility which allows the friction material to conform to the opposing surface thereby increasing the friction — the difference between an artgum eraser and a piece of hard wood sliding over a polished metal plate. A second reason is to improve the wear life of both the friction element and the drum or disc. A brittle material wears more rapidly, one might speculate, because friction results only from particles breaking away from and rolling between the surfaces; with a softer more rubbery bond the surfaces can distort and rebound, thus doing work and absorbing energy. The one problem with more bond or a softer bond is that thermal decomposition by the heat generated under high energy operation at the interface results in a loss of friction commonly known as "fade" when, even with added shoe pressure, the brakes may be unable to control the velocity of the vehicle.

After a friction material has been in use for some time it will be observed that the composition of the surface which rubs against the drum or disc is no longer the same as the substrate. At one extreme of service, such as in very light use, where the temperature never exceeds 200° C. the top 10 to 20 thousandths of an inch will be higher in bond, dark and shiny and partially carbonized; if the top 10 thousandths is machined off it will be higher in acetone extract than material below it. This glazed surface will reduce friction even when the brake is cold.

An intermediate and most satisfactory surface results from moderate conditions — usually in the range of 200° – 400° C. at the surface with a few peaks over 500° C. and soaking temperatures of 175° – 275° C. The surface will be dark grey to black, high in carbon and low in acetone extractables, in the range of 2 – 3%; the substrate will be little altered from the original composition.

A third and very unsatisfactory condition arises when the friction material has been grossly overheated with surface temperatures over 1000° C. at times and long soaking periods with 400° C. to 650° C. temperatures. The surface will be light grey to white and can be scraped off with a fingernail, showing raw asbestos fiber. Under these conditions friction is savage and wear is drastic. These results are found in brakes that are maladjusted so that they drag continuously and on vehicles that are heavily overloaded. The surface of the friction material is almost devoid of binder or organic filler and the acetone extracts are near zero.

The process that operates within the friction material as it changes from the original homogenous composition to any condition within the range described above can be studied by analysis of successive thin layers turned off, starting with the working surface. From such studies one learns that there is a graded depolymerization of the resinous binder to smaller molecules and at the same time at some levels under certain temperatures, reformation of larger, more complex molecules. Some of the products of these processes are hydrocarbons of a size range that may be oily and good lubricants resulting in the condition known in the industry as "fade", a sudden and dangerous loss of friction.

DESCRIPTION OF THE PRIOR ART

Of the known art, the following is listed as exemplary:

| | | |
|---|---|---|
| 2,686,140 | De Gaugue, Jr. | Aug. 10, 1954 |
| 2,901,456 | Spokes et al. | Aug. 25, 1959 |
| 3,168,487 | Spokes et al. | Feb. 2, 1965 |
| 3,227,249 | Kuzmick et al. | Jan. 4, 1966 |
| 3,751,330 | Gilbert | Aug. 7, 1973 |

Kearby, K.K. Catalytic Dehydrogenation, P. H. Emmett Ed., Catalysis, Vol. X, Reinhold, New York 1955

The art is distinguishable by the formulae, method and unique results hereinafter described and claimed, and by the following.

SUMMARY OF INVENTION

To control and lessen the degree of fade, the formulator is forced into a compromise, and thus keeps the binder level as low as he may without seriously affecting wear or inducing harsh friction and damage to the opposing face such as metal pick up and scoring. It has been ascertained that the most satisfactory conditions prevail where the binder can decompose and migrate to the surface gradually and the temperature conditions there are such as to cause a major proportion to remain there as a carbon deposit.

The objective of this invention is to add to the friction material composition, or more properly to the binder and other organic components thereof, compositions that will favor the deposition of carbon at elevated temperatures and reduce the amount of intermediate decomposition products that cause fade. This in turn will permit the use of higher bond ratios and consequently produce a better wearing, quieter friction material which is more constant in action and kinder to the drum or disc upon which it is used.

Ferrocene, or dicyclopentadienyliron has been used in polyvinyl chloride to reduce the smoke produced when it is burned; it accomplishes this when used in concentrations of 0.25–0.50%. In the application to PVC, increase in the carbon residue has been reported to be 200 to 250%. See the product FE 55 of Arapahoe Chemicals, Div. of Syntex Corp., Boulder, Colorado 80302. In the present invention ferrocene serves a distinctly unique purpose, as a dehydrogenation catalyst, pursuant to the above objectives.

DESCRIPTION OF THE PREFERRED EMBODIMENTS

The instant friction materials can be produced by molding a composition comprising:

A. at least one elastomer binder;
B. a granular filler
C. at least one organic friction modifier resin binder;
D. at least one curing agent
E. dehydrogenation catalyst, in sufficient quantity with respect to at least the binder A) to insure the deposition of carbon at elevated temperatures and reduce the amount of decomposition products which cause fade.

The dehydrogenization catalyst E) promotes carbonization of the binder and filler at a working surface thereof.

The following examples have proven to accomplish the objectives of invention as hereinabove summarized.

EXAMPLE I

A formula earlier developed to achieve higher static friction by adding organic friction particles to a compound already high in bond, did that, but failed to meet approval tests because of failure to maintain the required retarding force throughout the two 45 minute "drag" tests. The Association of American Railroads (AAR) has an approval test for composition brake shoes for use in interchange or non captive service, i.e. on cars that pass from one railroad to another.

The initial phase of this approval test consists of two consecutive "drag" test which consist of a continuous application of the brake to a railroad wheel being turned at 20 m.p.h. with a wheel load of 20,890 lbs. The first 45 minutes drag is run with a brake shoe load (pressure on the shoe) of 925 pounds without cooling, and must maintain a retarding force of 300 lbs. This means that the friction may not drop below 0.324 at any time during that test. After cooling the wheel, the test is repeated with a 1450 pound brake shoe load and must maintain a retarding force of over 400 lbs. (a minimum friction of 0.276).

The "drag" tests are followed by stop tests where the wheel is cooled between each stop (as will necessarily happen in service) and is not as subject to fade as is the drag test. These are designed to see that the stop distances for all speeds from 10 to 90 m.p.h. are within desired ranges.

My formula 4-01-31-B had such desirable characteristics in friction level, static and dynamic, sparking and metal pickup that it was selected to test an idea for reducing fade that came out of reading of the use of catalysts to reduce the smoke and increase the carbon deposit in fires involving polyvinyl chloride plastics.

Therefore, four identical mixes were prepared from the same raw material stock. The first of these, 4-01-31B was the same as the original which had failed because of fade in the drag test. The second, 4-10-10A had 0.06 parts by weight, (based on the entire mix of 100 parts) of the catalyst ferrocene added to the binder; the third and fourth, 5-02-14A and B had 0.12 parts of the catalyst added, 0.06 to the binder and 0.06 to the organic friction particles, the "A" being as molded like the two previous formula and the "B" formula having a post cure.

These formulae are as follows:

TABLE I

|  | 4-01-31B | 4-10-10A | 5-02-14A&B |
|---|---|---|---|
|  | Parts by Weight | | |
| W-757Bond[1] | 20.18 | 20.18 | 20.18 |
| Cast Iron Chips | 23.38 | 23.38 | 23.38 |
| NC-300 resin (solids)[2] | 11.19 | 11.19 | 11.19 |
| Mullite | 13.90 | 13.90 | 13.90 |
| Galena | 11.11 | 11.11 | 11.11 |
| Calcined Petroleum Coke | 6.12 | 6.12 | 6.12 |
| NC-104-40 Friction Dust[3] | 4.72 | 4.72 | 4.72 |
| 4T Asbestos | 9.40 | 9.40 | 9.40 |
| Ferrocene[4] | — | 0.06 | 0.12 |
| Totals | 100.00 | 100.06 | 100.12 |

1. The W-757 Bond is a preprepared binder consisting in parts by weight of the following:

| Buna S Rubber | 30.0 |
| Sulfur | 9.0 |
| Partially Polymerized Cashew Nut-shell oil resin (30–40% extract) | 15.0 |
| Litharge | 22.5 |
| Lead Powder | 7.5 |
| Carbon Black | 4.0 |
| Hexamethylene tetramine | 2.0 |
| Magnesium Oxide, heavy | 10.0 |
| | 100.0 |

This bond is prepared by sheeting out the cashew resin on a rubber mill, adding the rubber and then incorporating the fillers and sulfur. It is sheeted out and when used is swelled with a solvent and then mixed in an intensive mixer of the blade type with the other fillers and the resin shown in the brake shoe formulae.
2. NC-300 resin is a liquid (80% solids in toluol resin product of the Minnesota Mining & Manufacturing Co. prepared from cashew nut-shell oil. It is heat-reactable with hexamethylenetetramine to an infusible insoluble solid state.
3. NC-104-40 friction dust is a cured powdered cashew nut-shell oil product of the Minnesota Mining and Manufacturing Company.
4. Ferrocene at 0.06% comprises an organic metallic iron compound otherwise known as Dicyclopentadienyliron manufactured by Arapahoe Chemicals Division of Syntex Corporation at Boulder, CA as FE 55.

In preparing the formulae listed above, the bond is swelled by soaking in a closed vessel with sufficient solvent such as toluol or gasoline to make it workable in a dispersion blade intensive mixer, using an amount usually one fifth to one third the weight of the Bond. Swelling is hastened if the container is maintained at 65° C. or so, but added time is just as effective and may range from several hours at 65° C. to two days at room temperature, 21° C. The swelled bond is easier to handle and to remove from the container if it is interspersed with the cast iron chips while soaking.

The swelled bond with the cast iron chips, the galena and the mullite is worked in the intensive mixer until a smooth lump-free mix obtains, then the other components are introduced gradually with the asbestos fiber being the final addition, resulting in a uniform mix that breaks up into ½ to 1 inch lumps. These are dried three hours in an air circulated oven at 65° C, returned to the mixer to break up into smaller lumps, all under ½ inch and then further dried at 65° C. for a total of 15 hours to effectively remove the solvent. Obviously, the solvent may be removed more rapidly by heating in a vacuum and the solvent condensed for repeated use and furthermore to avoid atmospheric pollution and such a procedure is recommended for production.

The dried compound may be briquetted first or measured directly into a mold in which is also placed a steel back which has been coated with a resin or a proprietary bonding cement such as Chrysler Corp. Cycleweld. The mold is closed and subjected to pressure of 1000 to 3000 pounds per square inch and heated by any suitable method such as jacketing or by heated press platens so as to reach a temperature of 170° to 180° C. and maintained there for one half to 1 hour after which the completed brake shoe may be removed from the mold.

TEST RESULTS OF FORMULAE IN TABLE I

One of the most severe tests for approval of composition railroad brake shoes by the American Association of Railroads is the "Drag" test which simulates the use of the brakes to restrain a train going down long grades at a speed limited by the brakes to 20 m.p.h. The conditions for this dynamometer test are 20,890 lbs. wheel load (a 167,000 lb. car and load) at two brake shoe loads of 925 and 1450 lbs. for 45 minutes of continuous application for each load. At the conclusion of the 1450 lb. brake shoe load test the surface of the wheel tread measures over 300° C. by surface pyrometer after the wheel has been brought to a stop.

Many brake shoes which are within the AAR Stop Series where the wheel is cooled between each stop, as necessarily is the case in normal service, fail the drag test, particularly where the minimum retardation for the 1450 lb. brake shoe load is 400 lbs. at any time in the 45 minute drag, i.e. a friction level that does not fall below 0.276 at any time. Likewise, in the lighter drag at 925 lbs. wheel load the minimum retardation is 300 lbs.

The tests below present the results of drag tests run on the shoes molded from the prior compositions listed in TABLE I.

TABLE I

| TESTS OF TABLE I FORMULAE | | | | | |
|---|---|---|---|---|---|
| | | 4-01-31B | 4-10-10A | 4-01-31A | 4-01-31B |
| Retarding Force, lbs. 925 lb. Brake Shoe Load, | Max. | 420 | 440 | 430 | 440 |
| | Min. | 300 | 320 | 340 | 320 |
| | Av. | 350 | 366 | 371 | 364 |
| Retarding Force, lbs. 1450 lb. Brake Shoe Load | Max. | 740 | 710 | 750 | 720 |
| | Min. | 340 | 360 | 400 | 400 |
| | Av. | 450 | 475 | 489 | 488 |

Another compound was prepared without and with ferrocene; in this case, the 0.12 parts by weight of ferrocene replaced an equal weight of the largest component of inert filler, the mullite. The two compounds are shown in TABLE II, following.

TABLE II

| Compound Laboratory Number | 5-02-20A | 5-02-21A |
|---|---|---|
| | Parts by Weight | |
| Buna S Crumb Rubber | 6.49 | 6.49 |
| Cast Iron Chips | 20.79 | 20.79 |
| Ferrocene | | 0.12 |
| Sulfur | 2.03 | 2.03 |
| Carbon Black | 0.89 | 0.89 |
| Magnesium Oxide, Heavy | 2.20 | 2.20 |
| Partially Polymerized Cashew Nut-shell Oil Resin, 30-40% Extractable | 3.22 | 3.22 |
| Litharge | 5.00 | 5.00 |
| Lead Powder | 1.67 | 1.67 |
| Aluminum Oxide, Fused Grade FF | 0.30 | 0.30 |
| Liquid Cashew Nut-shell Oil Resin (Solids) | 10.42 | 10.42 |
| Hexamethylenetetramine | 0.54 | 0.54 |
| Galena | 11.61 | 11.61 |
| Mullite | 13.82 | 13.70 |
| Wollastonite | 6.19 | 6.19 |
| Synthetic Graphite Powder | 6.91 | 6.91 |
| #80 Ground Charcoal | 4.23 | 4.23 |
| Asbestos, 4T Grade | 3.69 | 3.69 |
| Total | 100.00 | 100.00 |

These compounds are mixed essentially the same as the previous TABLE I group, except that in this case the crumb rubber interspersed with the cast iron chips is first soaked with half its weight of toluol (or toluene or methylbenzene). A convenient way of adding the ferrocene, when used, is to dissolve it in the toluol.

Here again, as shown below, the addition of ferrocene improved the fade resistance of a compound that had been satisfactory in all other respects but for fade.

| TESTS OF TABLE II FORMULAE | | | |
|---|---|---|---|
| | | 5-02-20A | 5-02-21A |
| Retarding Force, lbs. 925 lb. Brake Shoe Load | Max. | 430 | 470 |
| | Min. | 300 | 310 |
| | Av. | 349 | 366 |
| Retarding Force, lbs. 1450 lb. Brake Shoe Load | Max. | 640 | 730 |
| | Min. | 360 | 400 |
| | Av. | 450 | 487 |

Here again, it is shown that the addition of an extremely small amount of ferrocene, one part in 833 of the compound, can increase both the minimum and average effective friction of a composition brake shoe under the most severe operating conditions.

While the above illustrations are confined to railroad brake shoes, one of the more severe applications of composition friction materials where they are replacing cast iron brake shoes, it is obvious to one skilled in the art that a similar advantage in fade resistance would result from the use of this type of catalyst in other organic bonded friction materials such as automotive brakes and clutches, aircraft brakes and industrial brakes and clutches such as are used on hoists, presses, tractors, winches, etc.

While in this case the ferrocene catalyst is incorporated in the resinous and elastomeric bonds by means of a mutual solvent, it is also obvious to one skilled in the art that it could be more conveniently incorporated in the resin or elastomer during its manufacture. Additionally, it is within the scope of invention to apply the ferrocene to formulae which include essentially all organically bonded friction materials excepting ceramics and sintered metals. The granular fillers too may vary to include various sands, as well as the iron grit listed in the above formulae.

I claim:

1. A friction material produced by molding a composition comprising:
   A. an elastomer binder consisting of a copolymer of butadiene and styrene;
   B. a granular filler
   C. partially polymerized cashew nutshell oil resin;
   D. at least one curing agent;
   E. dicyclopentadienyliron, in sufficient quantity with respect to the binder to insure deposition of carbon at elevated temperatures and reduce the amount of decomposition products which cause fade.

2. The composition of matter of claim 1 wherein the proportion of dicyclopentadienyliron is 0.06% of the weight of the composition.

3. The friction material of claim 1 additionally containing a liquid product comprising 80% solids of cashew nutshell resin in toluene and a friction dust consisting of a cured powdered cashew nutshell oil resin.

4. The friction material of claim 1 in which 0.06% by weight of dicyclopentadienyliron is added to the elastomer binder and 0.06% by weight of dicyclopentadienyliron is added to the friction dust.

5. A method for making the friction material of claim 1 comprising combining and mixing ingredients A, B, C, D, and E with a solvent, drying to remove the solvent and molding said composition.

6. The method of claim 5 in which dicyclopentadienyliron is combined in the form of a toluene solution.

7. The method of claim 5 in which asbestos is added to the solvent mixture of ingredients.

8. The method of claim 4 in which iron grit filler is the granular filler B).

* * * * *